Aug. 1, 1961 W. L. COLTERJOHN, JR., ET AL 2,994,575
ELECTRICAL INDICATING APPARATUS
Filed Oct. 22, 1956 3 Sheets-Sheet 1

Inventors:
Walter L. Colterjohn, Jr.
Alphonso F. Stanonis
By Robert F. Miehle, Jr. Atty.

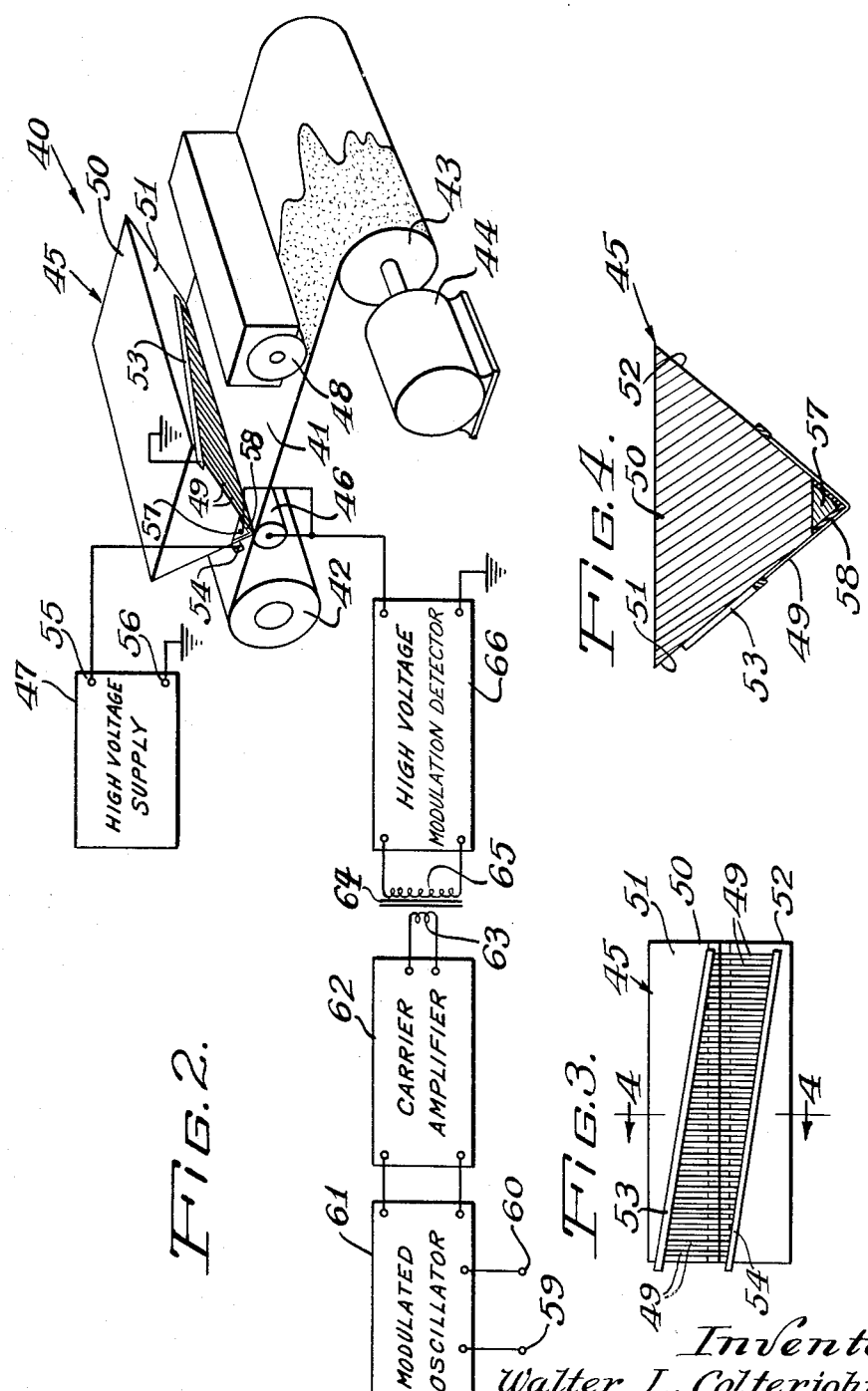

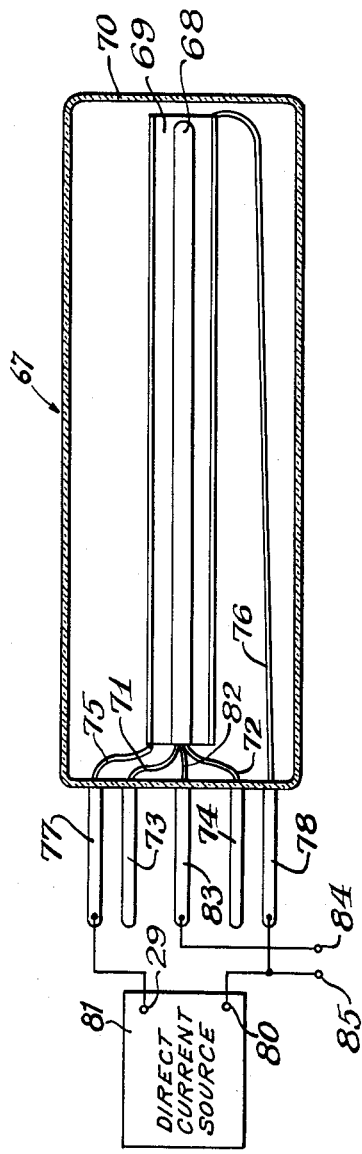

United States Patent Office 2,994,575
Patented Aug. 1, 1961

2,994,575
ELECTRICAL INDICATING APPARATUS
Walter L. Colterjohn, Jr., Oak Park, and Alphonso F. Stanonis, Des Plaines, Ill., assignors to Bell & Howell Company, Chicago, Ill., a corporation of Illinois
Filed Oct. 22, 1956, Ser. No. 617,365
6 Claims. (Cl. 346—74)

This invention relates to electrical indicating apparatus and more particularly to non-mechanical apparatus for providing an indication of the magnitude of an electrical current or voltage, either in the form of a meter for providing a temporary indication, or a graphic recorder for providing a permanent indication of the magnitude and fluctuations of an electrical current or voltage.

Prior art means for producing a temporary indication of the magnitudes of currents or voltages have generally been mechanical meters which are subject to damage from shocks and vibrations and require precision manufacture. Although non-mechanical meters have been proposed, such have been either unduly expensive, or inaccurate and unreliable.

Prior art means for producing a permanent record of electrical wave forms include cathode ray oscillographs, voltage discriminating trigger amplifier arrays, and mechanical transcriber arrangements. The cathode ray arrangement produces transient light indication and requires the use of photographic film for permanency. This method permits extremely high speed recording, but it entails the disadvantages of the handling and development of light sensitive materials. Recorder arrangements that use trigger amplifiers have high frequency potentiometers and immediate readout. They require, however, elaborate circuity and have a limited amplitude definition. Mechanical pen recorders have good definition and immediate readout but, among other disadvantages, have the limitation of low frequency response and inertia inaccuracies. Mechanical recorders that utilize the deflection of a light beam are limited at moderate frequencies by inertia effects and they require the use of photographic materials.

A recording arrangement has also been proposed in which a pair of resistive electrodes are arranged in parallel relation on opposite sides of a recording paper. A direct current source is applied through the resistors in a manner to obtain opposite voltage gradients with the potentials of adjacent portions of the electrodes being equal only at a null point. The paper is impregnated with an electrochemical compound decomposed by an electrical current such as an aqueous solution of iodide and bromide of potassium containing starch and dextrine, and a visible mark is produced on both sides of the null point with no mark being produced at the null point. A signal voltage is applied through a bridge circuit to simultaneously change the voltages applied to both electrodes and thereby shift the null point.

This proposed recorder, which might be termed a "shifting null point recorder," would appear to be relatively inexpensive and capable of accurate, high speed recording. However, it has been found that such a recorder requires a large amount of power for operation and comparison of the recorded wave form with the wave form produced on a conventional recorder known to be accurate, indicates that considerable distortions are produced. For these reasons, the shifting null point recorder has not been successfully used commercially even though the principle has been known in the art for a long time.

It is an object of this invention to provide recording apparatus operating on the shifting null point principle but which is accurate and reliable in operation, has a minimum power requirement and is readily and inexpensively constructed and operated.

Another object of this invention is to provide a non-mechanical meter operating on the shifting null point principle.

According to an important feature of this invention, a single resistive electrode is used in conjunction with a conductive electrode, instead of two resistive electrodes as used in the heretofore proposed arrangement. This simplifies construction and makes possible simplified circuit arrangements. In addition, the power requirement is reduced.

Another important feature of the invention is based on the discovery of the cause of the distortions encountered in the previously proposed arrangement. In particular, it has been found that a high current flow through the recording paper alters the voltage gradients along the resistive electrodes, to cause a shift in the null point and a non-linear recording, such being particularly bad because such non-linearity is not uniform but varies with variations in the conductivity of the paper.

According to this invention, shifting of the null point due to current flow through the recording medium is greatly reduced. In one preferred embodiment of the invention, a special electrochemical recording medium is used in a manner to minimize distortions and also to greatly reduce the power requirement. In another preferred embodiment, an electrostatic recording arrangement is provided in which distortions are minimized.

A further feature of the invention is in the provision of means for providing a temporary indication of the null point between a pair of parallel electrodes, to thus provide an accurate non-mechanical meter. This arrangement may also incorporate means for preventing shifting of the null point due to current flow through the indicating means.

This invention contemplates other and more specific objects, features and advantages which will become more fully apparent from the following detailed description taken in conjunction with the accompanying drawings which illustrate preferred embodiments and in which:

FIGURE 2 is a diagrammatic illustration of another preferred form of recorder constructed according to the principles of this invention, especially designed for use with an electro-static recording medium;

FIGURE 3 is a bottom plan view of the upper electrode used in the arrangement of FIGURE 2;

FIGURE 4 is a cross-sectional view, on an enlarged scale, taken substantially along line IV—IV of FIGURE 3; and FIGURE 5 is a schematic illustration of a non-mechanical meter constructed according to the principles of this invention.

Figure 1:
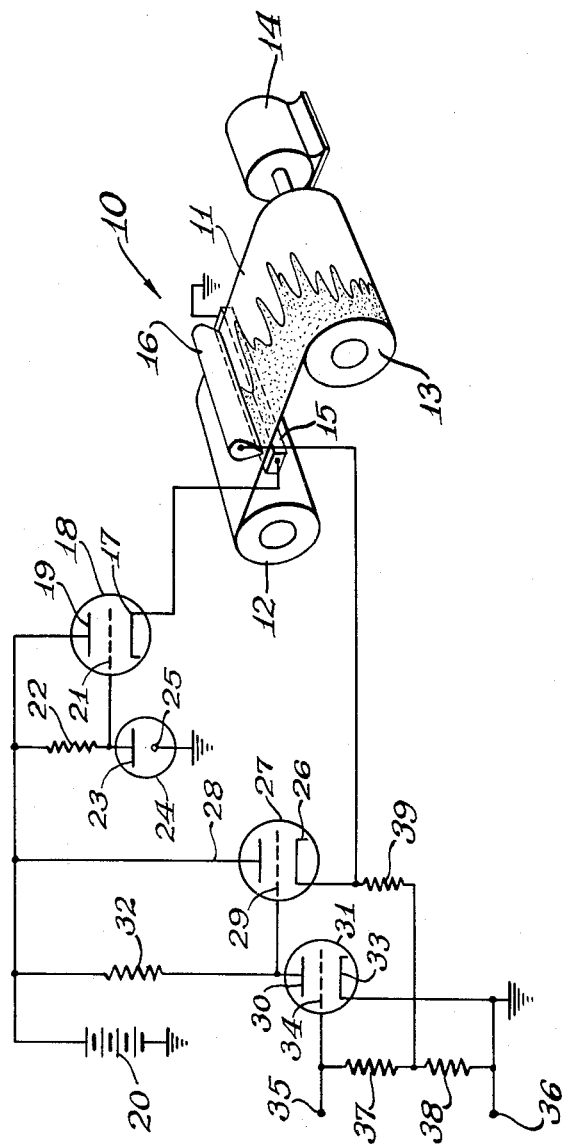
FIGURE 1 is a diagrammatic illustration of one preferred form of recorder constructed according to the principles of this invention, especially designed for use with an electro-chemical recording medium.

Referring to FIGURE 1, reference numeral 10 generally designates one preferred form of recorder constructed according to the principles of this invention. In the recorder 10, a recording medium 11, preferably in the form of a flat strip of paper or the like, travels from a supply roll 12 to a take-up roll 13 driven by means such as an electric motor 14. A pair of spaced parallel electrodes 15 and 16 are arranged in proximity to spaced parallel portions of the medium 11. Preferably, the medium 11 passes between the electrodes 15 and 16 as illustrated.

The electrode 15 is of resistive material and is connected at its opposite ends to a voltage source so as to develop a potential gradient therealong. The electrode 16 is of conductive material and is connected to a voltage source such that the potentials of adjacent portions of the electrodes 15 and 16 will be equal at a null point. The recording medium 11 is of such composition that current may flow therethrough from one electrode to the other to produce a detectible change, preferably visible, in the medium 11 on one or both sides of the null point with no indications being produced at the null point.

Accordingly, with a varying signal voltage applied to one of the electrodes at the same time that the medium 11 is moved from the supply roll 12 to the take-up roll 13, a graphic record of variations in the signal voltage will be obtained, as is illustrated diagrammatically in FIGURE 1.

FIGURE 1 illustrates one preferred circuit arrangement for supplying voltages to the electrodes 15 and 16. In this arrangement, one end of the resistive electrode 15 is connected to ground and the other end thereof is connected to the cathode 17 of a triode 18 having a plate or anode 19 connected to the positive terminal of a battery or other direct current source 20 the other terminal of which is connected to ground. The triode 18 has a grid 21 connected through a resistor 22 to the positive terminal of the battery 20 and also to the anode 23 of a voltage regulator tube 24 having a cathode 25 connected to ground. This circuit operates to supply a substantially constant voltage across the electrode 15 despite variations in the output voltage of the battery 20, or other variables.

The conductive electrode 16 is connected to the cathode 26 of a triode 27 having a plate or anode 28 connected to the positive terminal of the battery 20 and having a control grid 29 connected to the plate 30 of a triode 31. The plate 30 is connected through a resistor 32 to the positive terminal of the battery 20 and the triode 31 has a cathode 33 connected to ground, and a control grid 34 connected to a signal input terminal 35, another terminal 36 being connected to ground. A pair of resistors 37 and 38 are connected in series between the grid 34 and ground, the junction therebetween being connected through a resistor 39 to the cathode 26 of the triode 27.

In operation, the potential of the grid 34 is varied in response to variations in the input signal to thereby vary the potential of the plate 30 and the grid 29, to thereby vary the potential of the cathode 26 and hence the potential of the electrode 16. With the cathode 26 of the triode 27 being returned to ground through the resistor 38 in the grid circuit of the triode 31, a negative or inverse feedback is obtained, so that the potential of the cathode 26 will accurately correspond to the potential of the input terminal 35.

It may be noted that by use of a conductive electrode and a signal resistive electrode, the power requirement is reduced to about one-half that that would be required if two resistive electrodes were used. In addition, this feature makes it possible to use a single direct current source for supplying power to the amplifier and developing the potential gradient on the electrode 15. Further, the construction is greatly simplified, particularly when it is desired to employ an electrochemical action in which the metal of an electrode is combined with chemicals of the recording medium to produce the visible indication.

It has been discovered that the electrical behavior of the recording medium is very important. In particular, the medium should be such that the amount of charge that can be transmitted is limited, so that the resistance is greatly increased after the flow of an amount of electricity sufficient to produce a detectible indication. With such a medium, a much more accurate indication is produced since the shift of the null point due to current flow through the recording medium is greatly reduced. Also, the use of such a medium reduces power consumption and prevents over development in areas where a large potential difference exists between adjacent points of the electrodes.

An example of such behavior is provided by a paper moistened with an ethyl alcohol solution of dimethyl glyoxime and a small quantity of an electrolyte such as acetic acid. The electrode 16 should in this example be of nickel and a trace is produced at the electrode 16 upon the formation of nickel ions. A uniform density trace is left irrespective of paper speed and voltage within limits. The current through the paper falls off substantially after the trace marking is produced in the area of contact. Without this type of behavior, the electrolytic null point recorder is regarded as impractical for moderate frequency and good definition operation.

It will be appreciated that other types of mediums may be used, so long as this behavior is provided, by limiting the amount of one or more of the chemicals contributing to the reaction so as to reduce current flow after the flow of a quantity of electricity sufficient to produce a detectible indication. The proper composition can be readily determined by simple preliminary tests.

The electrode 15 may be of any suitable resistive material, or may comprise a large number of spaced conductive elements arranged to engage the recording medium with connections from such elements to taps on a separate resistor element. According to a specific feature of the invention, a type of resistance material is used whose resistance decreases with an increase of electric field. Such a material, generally referred to as a varistive material, decreases the potential distortion in the resistive electrode caused by current flow through the recording or indicating medium.

Referring now to FIGURE 2, reference numeral 40 generally designates another preferred form of recorder constructed according to the principles of this invention. In the recorder 40, a paper recording medium 41 moves from a supply roll 42 to a take-up roll 43 driven by an electric motor 44. The medium 41 moves between a pair of electrodes generally designated by reference numerals 45 and 46, arranged in spaced parallel relation on opposite sides of the medium 41.

A high voltage supply 47 is connected to the electrode 45 to develop a potential gradient therealong, the electrode 45 having a special construction to be described in detail. The electrode 46 is of a conductive material and is connected to a source of signal voltage also to be described in detail hereinafter.

In the general operation of this arrangement, the potentials of adjacent portions of the electrodes 45 and 46 are equal at a null point which is shifted along the electrodes, transversely of the medium 41, in accordance with the amplitude of the signal voltage. The medium 41 is of paper or other dielectric material and a charge is developed thereon at all points except the null point.

Means are provided for rendering visible the charge pattern on the medium 41. In particular, a roll 48 is arranged to apply minute particles to the surface of the medium 41 which are attracted to the charged areas thereof. The particles may, if desired, be charged with one polarity so as to be attracted only to the portions of the medium charged with the opposite polarity. Other types of developing means may, of course, be employed.

With this electro-static recording arrangement, the medium itself constitutes means for reducing current flow after a detectible indication is produced, since the current flow reduces as the electro-static charge builds up. The electro-static recorder 40 thus requires a minimum amount of power and is capable of highly accurate operation. However, in some circumstances it is found that extraneous traces and other faulty indications are produced and it has been discovered that such are produced by a corona type tendency of the charge to spread and concentrate in limited areas of highly charged regions. The special electrode 45 was evolved to eliminate such faulty indications and to produce other desirable results.

In general, the electrode 45 comprises a plurality of separate resistive elements 49 connected to the high voltage supply 47, the elements being tapped off for contact with the medium at points such that a voltage gradient is produced along the electrode. Each tap point is connected to the electrode 46 through a non-linear element whose resistance decreases substantially at voltages higher than a value sufficient to produce a detectible indication. With this arrangement, the magnitude of voltage between adjacent points of the electrodes 45 and 46 is limited, regardless of the position of the null point. Thus the charge of any incremental portion of the medium 41 is limited and the spread of charge is also limited. This arrangement also insures accurate reproduction in that the position of the null point is not affected by current flow.

The illustrated electrode 45 comprises a support member 50 of insulating material which may be of generally triangular shape to provide surfaces 51 and 52 which converge toward a line of engagement with the recording medium 41. A pair of strips 53 and 54 of conductive material are mounted on the surfaces 51 and 52 in generally parallel relation, but at an angle to the line of engagement with the medium 41. The resistance elements 49 extend between the strips 53 and 54. The strip 53 is connected to ground, and the strip 54 is connected to a terminal 55 of the high voltage supply 47 the other terminal 56 thereof being connected to ground.

A generally triangularly shaped element 57 is mounted on the support member 50 inside the resistance elements 49, the element 57 being of conductive material and being connected to the electrode 46. Between the element 57 and the portions of the elements 49 which engage the medium 41, a non-linear element 58 is diposed. This element can take the form of a gas gap, a thin film of material of appropriate breakdown voltage or a varistive material.

FIGURE 2 diagrammatically illustrates a preferred arrangement for applying a signal voltage to the conductive electrode 46. In this arrangement, the signal to be recorded is applied to a pair of input terminals 59 and 60 to modulate an alternating current signal produced by any suitable means such as an oscillator 61. The modulated output of the oscillator 61 may be applied through an amplifier 62 to the primary 63 of a transformer 64 having a secondary 65. The transformer 64 may be a step-up transformer to produce a relatively high voltage across the secondary 65. This high voltage modulated high frequency signal is applied to a modulation detector 66 to develop a high voltage varying in accordance with the signal applied to the terminals 59 and 60. This high voltage is applied between the electrode 46 and ground. With this arrangement, it is not necessary to use a high voltage direct current source to apply the signal to the electrode 46, the signal being produced merely by rectification of the modulated high voltage signal produced at the secondary 65.

Referring now to FIGURE 5, reference numeral 67 generally designates another preferred embodiment of the invention in the form of a meter for providing a temporary indication. In the meter 67, a pair of electrodes 68 and 69 are mounted in spaced parallel relation within an evacuated envelope 70 of transparent material such as glass. The electrode 68 is in the form of a cathode composed or coated with a suitable electron-emitting material which may be heated either directly or indirectly by a suitable heater therewithin connected through wires 71 and 72 which may be connected to terminal pins 73 and 74 to be connected to a suitable supply.

The electrode 69 forms an anode and is of a resistive material, or has resistance means associated therewith, with the opposite ends thereof being connected through wires 75 and 76 to terminal pins 77 and 78 which are connected to terminals 79 and 80 by a direct current source 81. Accordingly, a potential gradient is established along the electrode 69.

The cathode 68 is connected through a wire 82 to a terminal pin 83 which is connected through an input terminal 84, another input terminal 85 being connected to the pin 78 and the terminals 80 of the direct current source 81. A voltage to be measured is applied to the terminals 84 and 85 to establish a voltage on the cathode 68 which will be equal to the voltage or potential of the anode 69 at a null point. To indicate the position of the null point, the surface of the anode 69 which faces the cathode 68 is coated with a suitable luminescent material. Accordingly, by electron flow from the cathode 68 to the anode 69, the anode 69 will luminesce on one side of the null point and will not on the other side thereof.

Means may be provided in this arrangement for limiting the amount of current flow after a detectible indication is produced. In particular, the cathode 68 is heated to a temperature such that saturation takes place at a value of current sufficient to produce visible luminescence at the anode 69.

It will be understood that modifications and variations may be effected without departing from the spirit and scope of the novel concepts of this invention.

We claim as our invention:

1. In an electrical indicating system, a pair of elongated electrode means in spaced parallel relation, at least one of said electrode means including resistance means for developing a voltage gradient therealong, means for applying voltages to said electrode means with the potentials of adjacent portions of said electrode means being effectively equal at a null point, means for shifting said null point in accordance with an input voltage, indicating means disposed along said electrodes and arranged to produce a detectible indication in response to potential differences between adjacent portions of said electrodes thereby to indicate the position of said null point, and means for increasing the effective resistance to current flow between adjacent portions of said electrodes after flow of current of a value sufficient to produce a detectible indication.

2. In an electrical recording system, a pair of elongated electrode means in spaced parallel relation, at least one of said electrode means including resistance means for developing a voltage gradient therealong, means for applying voltages to said electrode means with the potentials of adjacent portions of said electrode means being effectively equal at a null point, means for shifting said null point in accordance with an input voltage, and a recording medium movable between said electrodes and having a chemical composition such that the amount of electrical current transmitted therethrough is so limited that the resistance is increased after flow of an amount of electricity sufficient to produce a detectible chemical change.

3. In an electrical indicating system, a pair of elongated electrode means in spaced parallel relation, one of said electrode means including a member of conductive material to be at a uniform electrical potential therealong, the other of said electrode means including resistance means for developing a voltage gradient therealong, means for applying voltages to said electrode means with the potentials of adjacent portions of said electrode means being effectively equal at a null point, amplifier means connected to said electrode means for shifting said null point in accordance with an input voltage, indicating means disposed along at least one of said electrodes and arranged to produce an indication of potential differences between adjacent portions of said electrode means thereby to show the position of said null point, and a common direct current source for supplying power to both said amplifier means and said voltage-applying means.

4. In an electrical recording system, a pair of elongated electrode means in spaced parallel relation, one of said electrode means including a member of conductive material to be at a uniform electrical potential therealong, the other of said electrode means including resistance means for developing a voltage gradient therealong, means for applying voltages to said electrode means with the potentials of adjacent portions of said electrode means being effectively equal at a null point, means for shifting said null point in accordance with an input voltage, and a recording medium movable between said electrodes and having a chemical composition such that a detectible chemical change is produced in response to current flow due to potential differences between adjacent portions of said electrode means.

5. In an electrical recording system, a pair of elongated electrode means in spaced parallel relation, one of said electrode means being defined by a member of nickel, the other of said electrode means including resistance means for developing the voltage gradient therealong, means for applying voltages to said electrode means with the potentials of adjacent portions of said electrode means being effectively equal at a null point, means for shifting said null point in accordance with an input voltage, and a paper recording medium movable between said electrode means, said paper being moistened with an ethyl alcohol solution of dimethyl glyoxime in a small quantity of an electrolyte such as acetic acid.

6. In an electrical indicating system, a pair of elongated electrode means in spaced parallel relation, at least one of said electrode means including resistance means for developing a voltage gradient therealong, means for applying voltages to said electrode means with the potentials of adjacent portions of said electrode means being effectively equal at a null point, means for shifting said null point in accordance with an input voltage, and indicating means disposed along at least one of said electrodes and arranged to produce a detectible indication of potential differences between adjacent portions of said electrodes thereby to show the position of said null point, said resistance means including a varistive material wherein an increase of field causes a decrease in resistance.

References Cited in the file of this patent

UNITED STATES PATENTS

| | | |
|---|---|---|
| 2,098,519 | Ruben | Nov. 9, 1937 |
| 2,175,690 | Hoppe | Oct. 10, 1939 |
| 2,273,142 | Roberts | Feb. 17, 1942 |
| 2,739,865 | Willey | Mar. 27, 1956 |
| 2,890,921 | Megger | June 16, 1959 |